April 3, 1951  J. B. WALKER  2,547,187
LENS ADJUSTING MECHANISM
Filed Jan. 24, 1949

INVENTOR
JOSEPH B. WALKER

BY Westall & Westall
ATTORNEYS

Patented Apr. 3, 1951

2,547,187

UNITED STATES PATENT OFFICE 2,547,187

LENS ADJUSTING MECHANISM

Joseph B. Walker, Hollywood, Calif.

Application January 24, 1949, Serial No. 72,508

7 Claims. (Cl. 88—57)

This invention relates to lens adjusting mechanisms having particular application to motion picture and television cameras and as such contemplates improvement over the devices of my Patent No. 1,898,471 dated February 21, 1933, and of my co-pending application S. N. 791,897, filed December 15, 1947, now Patent No. 2,506,947, dated May 9, 1950, and S. N. 32,160 filed June 10, 1948, now Patent No. 2,532,684, dated December 5, 1950, of the latter two of which the present application constitutes a continuation-in-part.

As is well known it is possible to progressively vary the magnification of pictures produced by motion picture or television cameras by shifting elements of the lens system relative to one another. However, the movement of the primary lens for this purpose disturbs the proper focusing of the system with the result that compensatory and coincidental adjustment of a secondary lens element or combination is required in order to maintain the subject in focus throughout the range of movement of the primary lens assembly. Cam mechanism for effecting the requisite adjustment of the secondary lens combination for the purposes indicated is disclosed in my patent and in each of the co-pending applications above-identified.

While the utility of cam for imparting variable motion to one lens combination while manually moving another lens combination of the system at a different speed is recognized as of practical significance in effecting the focal compensation necessary, the embodiment of such mechanism in a form adaptable to accommodate lenses of numerous types in common usage and to conform to the construction of conventional cameras and associated equipment is a current problem of primary concern. Aggravating this deficiency of prior art mechanisms is the difficulty of obtaining the requisite progressive critical adjustment of the respective lens combinations during the process of magnification.

It is therefore a principal object of the present invention to provide mechanisms having peculiar application to lens systems in conventional equipment for converting manually induced longitudinal movement, at a constant speed, of one lens combination to movement in the same line of direction of another combination but at a different velocity, the required precise ratio of speed of movement of said lens combinations being obtainable with accuracy and facility.

Another object is the provision of apparatus for supporting and shifting lens elements relative to one another wherein the velocity pattern of movement of each lens as well as the direction of movement thereof is variable so as to permit an adjustment of the primary lens to obtain any degree of progressive magnification desired and a coincidental focal adjustment of a mounting for a secondary lens combination of any conventional type so as to maintain the focus throughout the range of movement of the primary elements.

More specifically it is an object hereof to provide cam mechanisms for shifting a secondary lens element in a direction coaxial with the primary element, wherein the cam is disposed in a plane parallel to the focal axis thus tending to minimize the cross-sectional area of the assembly while permitting a wide range of movement of the primary element and a compensating relative short movement, in either or successively both directions as determined by the cam, of the secondary element.

Another object is the provision of a bell crank actuated by motion, manually induced and exerted against a long arm of the crank, of a primary lens carrier, for transmitting movement in the same line of direction, through the shorter arm of the crank, to a secondary lens whereby maximum leverage is exerted upon the secondary lens and most critical adjustment of the latter is obtainable.

Still another object is to provide a dual adjustment for a flexible cam by which the pattern of movement of the secondary lens combination is determined so as to compensate for variations in the distance between the camera and subject and, independently, to delineate a contour complementary to the pattern of required movement of a secondary lens combination so as to maintain the focus during magnification of the subject.

Other important objects and salient features of the invention include compactness, simplicity of operation and adjustment, positive action, adaptability to numerous types of lens systems, as well as permitting maximum range of magnification of images of subjects spaced from the lens system from a few feet to infinity, will be apparent to those of skill in the art upon an examination of the following description read in the light of the accompanying drawings, in which.

Figure 1:
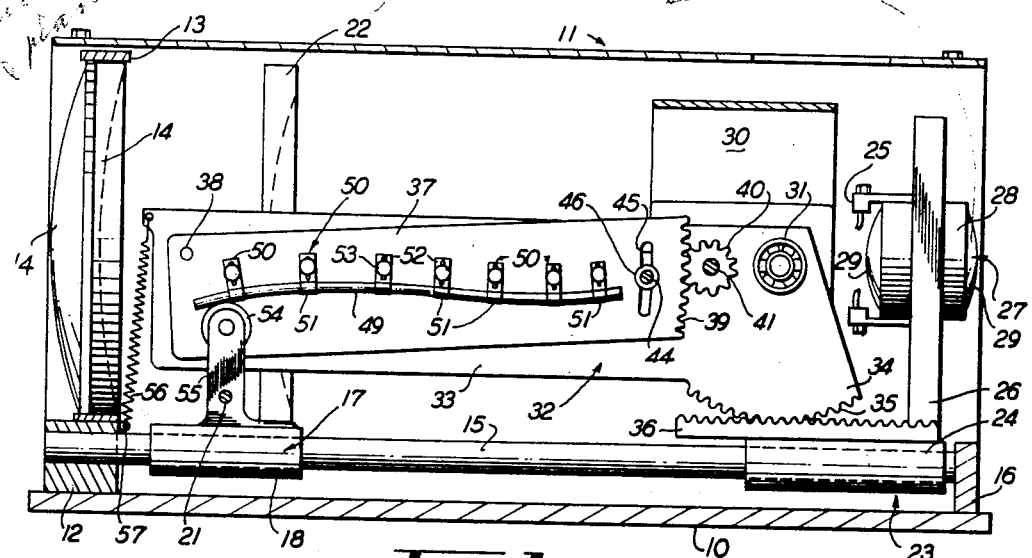
Fig. 1 is a side elevation of a lens system embodying my invention.
Figure 2:
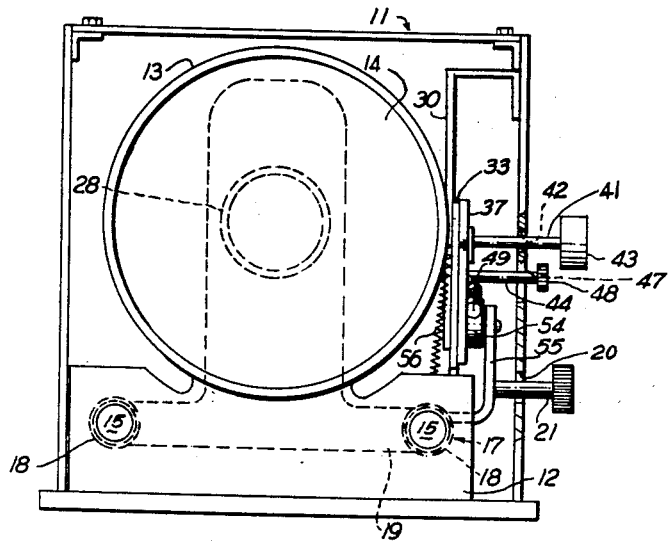
Fig. 2 is a front elevation of the mechanism shown in Fig. 1.

In preferred embodiment, the invention contemplates generally three lens combinations or elements, one of which is stationary relative to the focal plane of the camera and the others are movable coaxially relative to one another on the focal plane. In the drawing wherein like numerals indicate similar parts throughout the several views 10 designates a suitable base forming the bottom of an elongated casing 11, rectangular in cross section, for the lens system hereinafter described. It will be understood that the lens system and its supporting means are adapted for assembly with conventional photographic and television cameras, the mechanism of which, forming no part of the present invention, is not illustrated or described. Correspondingly, the means by which the casing 11 is secured in operative position with the camera proper, being conventional in form, is not illustrated. In the forward end of the casing a block 12 is mounted for the support of a lens frame 13 in which lens elements 14—14 are secured by suitable means in a position stationary with respect to the casing 11 and the camera to which the casing is attached in use.

Corresponding forward ends of a pair of guide rods 15 are mounted in horizontal alignment and in spaced relation in the block 12. The rearward ends of the rods 15 are similarly mounted in a block 16 secured to the bottom 10 at the rearward end of the casing. A lens carrier 17 comprising a pair of tubular members 18 telescopically associated with the respective rods 15 and an intervening, integral web 19 is slidably disposed on the guide rods so as to permit its being shifted rearwardly in response to manual motivation. Projecting laterally through an elongated horizontally-disposed slot 20 in one side of the casing 11 is a handle 21 secured at its inner end rigidly to the side of the lens carrier 17, whereby a lens 22 mounted upon the web 19 of the carrier 17 in optical alignment with the lens combination 14—14 may be shifted toward and away from the latter.

A second carrier 23 for a secondary lens assembly comprises tubular members 24 telescopically associated with the guide rod 15 and an intervening integral web, and is slidable upon the guide rods intermediate the carrier 17 and the rearward end of the casing 11. Mounted in vertical position upon the carrier 23 is a lens support 26 for the secondary lens combination 27 comprising a cylindrical mounting 28 and lens element 29—29. The secondary lens combination 27 is supported in coaxial relationship with the primary lens 22 and the lens combination 14—14 and as both primary and secondary lens elements are carried by the same guide rods 15, this relationship will be maintained throughout the range of adjustment of the primary and secondary lens elements with respect to one another. Connected to the mounting 28 is a conventional diaphragm assembly 25.

The adjustment of the secondary lens combination 27 is accomplished and maintained throughout the range of movement of the primary lens 22 by mechanism about to be described, which is actuated by a movement of the primary lens carrier 17. This mechanism comprises a hanger 30 suspended from one side of the casing adjacent and forward of the secondary lens combination 27. The depending portion of the hanger 30 is laterally offset from the line of movement of the primary and secondary lenses and provides support for a bearing 31. The bearing forms a fulcrum for a bell crank 32, one arm 33 of which extends forwardly to a point adjacent the stationary lens combination 14—14. The other considerably shorter arm 34 of the bell crank 32 projects downwardly and its lower edge delineates an arc having its center coincident with the axis of the bearing 31 and is formed with a plurality of gear teeth 35. The downwardly directed teeth 35 of the bell crank 32 are continuously engaged with a gear rack 36 therebelow which is secured rigidly to the secondary lens carrier 23. Thus slight movement of the forwardly-extending arm 33 in a vertical arc about the fulcrum of the bell crank 32 induces horizontal movement of the carrier 23 and secondary lens combination 27 on the guide rods 15. Due to the difference in lengths of the arms 33 and 34 of the bell crank 32 only a very slight movement of the secondary lens 27 will result from a much more substantial movement of the forward end of the arm 33 of the crank.

Control of the movement of the forward end of the bell crank 32 is effected by spring-loaded cam mechanism. To this end a cam plate 37 is pivoted as at 38 to the arm 33 of the bell crank 32 adjacent the forward end of the latter. The cam plate 37 is of a length only slightly less than that of the arm 33 which it parallels. The rearward end of the cam plate 37 is formed with a plurality of gear teeth to provide a rack 39 in the form of an arc having its center on the pivot 38 of the plate 37. The rack 39 is engaged by a pinion 40 mounted upon a lateral shaft 41, suitably journalled in the bell crank 32 forward but adjacent the fulcrum bearing 31. The shaft 41 projects laterally through an opening 42 in the adjacent side of the casing 11 and is equipped with a knurled knob 43 to facilitate manual rotation of the pinion 40 and the corresponding vertical adjustment of the toothed end of the cam supporting plate 37. The opening 42 in the casing 11 through which the pinion shaft 41 extends is sufficiently large to permit unrestricted movement of the bell crank of its fulcrum within the range required for effective operation of the device, as is hereinafter more clearly indicated.

The pivotal adjustment of the cam plate 37 incident to rotation of the pinion 40 may be fixed by a friction lock comprising a screw 44 the shank of which projects through an arcuate slot 45 in the cam plate adjacent the rack 39 and is threaded into the bell crank 32. The screw 44 is formed with an enlarged shank forming a shoulder 46 adapted to bear against the plate 37 and bind the latter against the bell crank 32. The slot 45 in the plate defines an arc having its center on the pivot 38 of the plate so as to permit unrestricted pivoting of the plate when the locking screw is released, in response to rotation of the pinion 40. The screw 44 is of a length to extend through a slot 47 which is transversely aligned, and corresponds in form and dimensions, with slot 45 in the adjacent side of the casing 11 and is equipped with a knob 48 exteriorly to the casing to facilitate its actuation.

The cam 49 comprises a strip of semi-flexible material of a type well known in the art, and is supported from the side of the plate 37 directly above the nearest adjacent guide rod 15 by a series of retaining clamps 50. Each clamp 50 comprises a strip of metal having an arcuate section 51 adapted to overlie the cam 49 and a flat extension 52, slotted for the projection therethrough of a screw 53 by which the clamp 50 is secured rigidly to the face of the cam plate 37. Thus with the screws 53 loose the cam 49 may be arranged in any of various contours and the clamping elements 50 pivoted or shifted longitudinally to accommodate the new cam contour, whereupon the tightening of the screws 53 will maintain the adjusted position of the cam.

The underside of the cam 49 is engaged by a cam follower comprising a roller 54 journalled in the upper end of a vertical standard 55 mounted upon the forward lens carrier 17. In order to maintain the cam 49 and follower 54 in continuous contact throughout the range of movement of the carrier 17 from one end of the cam to the other I provide a helical spring 56 interposed between the upper forward corner of the bell crank 32 and a lug 57 secured to the block 12 upon which the foremost lens combination 14—14 is mounted.

The use and operation of the assembly is further briefly described as follows: It will be appreciated that the initial relationship of the various lenses with respect to one another depends primarily upon the characteristics of the lenses making up the system, and the distance of the subject to be photographed or televised from the camera. For most purposes, the primary lens element or combination 22 may be disposed at the forward end of the casing 11 with the roller 54 engaging the corresponding end of the cam 49. Initial focusing adjustment for the specific type of lenses employed may be accomplished by shifting the secondary lens combination 27 in its support 26 either toward or away from the primary lens 22.

Once that this initial proper relationship has been established, compensation for variation in the distance between the camera and the subject may be made by rotary adjustment of the knob 43 connected to the pinion 40 so as to tilt the toothed end 39 of the cam plate 37 either up or down and thereby raising or lowering the forward end of the cam 49 due to the offset relationship of the pivot 38 between the cam plate 37 and bell crank 32. As the spring 56 maintains a substantially constant tension upon the crank arm 33 the bell crank 32 will be swung on its fulcrum 31 very slightly incident to such adjustment of the pinion 40 actuating knob 43 and will correspondingly shift the secondary lens combination 27. With the image of the subject reduced to a minimum as limited by the forward end of the range of movement of the primary lens 22 only very slight adjustment of the secondary lens 27 is normally required to compensate for variations in the distance between the camera and subject, and accordingly under normal circumstances the offset relationship between the pivot 38 of the cam plate 37 and the forward end of the cam 49, is sufficient to effect the requisite adjustment of the secondary lens system 27 through rotation of the pinion 40. Variation in the distance between the camera and subject compel not only a correction in initial focusing adjustment of the secondary lens, but, as the primary lens is moved rearwardly, a progressively greater change in the movement pattern of the secondary lens is normally required. It will be observed that by reason of the cam plate 27 being pivoted at the forward end of the bell crank the correction in placement of the cam 49, through rotation of the pinion 40, will be progressively greater towards its rearward end.

While the characteristics of lenses of almost all types which are adaptable to utility in apparatus of the type herein contemplated will require a progressively greater adjustment of the secondary lens combination with respect to the primary lens as magnification is increased, the precise pattern of movement of the secondary lens combination 27 in order to maintain a critical focus during magnification of the subject incident to movement of the primary lens 22, varies substantially both in its direction and in the velocity of its movement relative to that of the primary lens. The determination of the direction and extent of movement of the secondary lens 27 in relation to the manually-induced movement of the primary lens 22 is accomplished by preadjustment of the cam 49 on the face of the plate 37. This operation is most easily effected by placing the primary lens at the foremost end of its range of movement, indicated in Fig. 1, and then shifting it slightly with the screws 53 of the cam-locking clamps 50 loosened. The primary lens is then progressively shifted rearwardly in short steps while manually varying the position of the secondary lens 27 so as to assure a proper focus of the subject at each step and progressively locking the clamps 50 nearest adjacent the roller 54.

An important feature of the invention resides in the mechanism which permits arrangement of the cam 49 in a plane parallel to the optical axis so as to minimize the cross sectional dimension of the assembly and thus adapt the unit to utility with conventional type television and motion picture camera equipment. Such arrangement further permits utility of a long arm 33 and by transmitting the motion imparted by variations in the contour of the cam 49 to the secondary lens system through a short arm 34 and the gear segment 35 and rack 36, maximum leverage is obtained, thus reducing the effective pressure upon successive reaches of the cam 49. Accordingly, wear on the cam is reduced to a minimum, and more critical adjustment of the cam is made possible.

Figure 3:
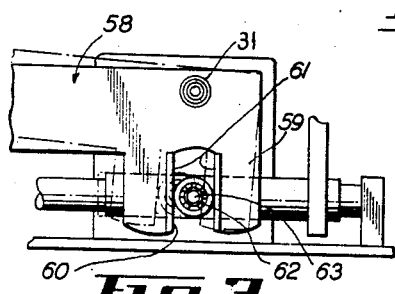
Fig. 3 is a side elevation of a modified form of the device for transmitting the movement of the cam-actuated bell crank to a secondary lens mounting.

In Fig. 3 I have illustrated a modified form of mechanism, wherein the gear segment 35 and rack 36 are omitted, to transmit the motion of the bell crank to the rearward secondary lens carrier 23. In this embodiment the bell crank 58 corresponds to crank 32 with the exception that its short arm 59 is formed with a vertical slot 60 having parallel opposed surfaces 61 spaced apart sufficiently to encompass a bearing 62 journalled upon a short stub shaft 63 projecting laterally from the adjacent side of the secondary lens carrier 23. The swinging of the short arm 59 of the crank 58 incident to the movement of the roller 54 along the cam 49 shifts the secondary lens combination 27 along the guide rods, as indicated in dotted lines in Fig. 3, for the purposes hereinabove more in detail described.

While the embodiment illustrated represents a presently preferred construction for particular applications it will be appreciated that many changes may be made in the size, design, shape, number and proportion of the various parts, and more specifically any conventional materials or types of flexible cams may be substituted for that generally indicated, that any suitable mechanism may be utilized to transmit the motion of either the bell crank 32 or cam plate 37 to the secondary lens combination, and that the lenses of the respective stationary lens combination 14—14 and the secondary lens combination 27 may be adjustable relative to one another if desired—without departing from the scope of the claims appended hereto.

What I claim and desire to secure by Letters Patent is:

1. In a lens system, a supporting member, a first lens, and a second lens, means to slidably support and maintain said lenses, axially coincident, upon said supporting member for movement in directions toward and away from one another, a bell crank pivoted upon said supporting member and comprising a long arm and a short arm, a cam carried by said long arm, a cam follower connected to said first lens to engage said cam and in response to movement of said last-named lens to shift said bell crank, and means actuated in response to movement of said bell crank, connected to the short arm of said bell crank and to said second lens to shift the latter in a direction axially coincident with said first lens.

2. In a lens system, a supporting base, a pair of lenses, each reciprocably mounted upon said base for movement toward and away from one another and relative to said base, a bell crank pivoted on said base comprising a long arm and a short arm, cam mechanism operatively interposed between one of said lenses and the long arm of said crank to move said bell crank on its pivot in response to axial movement of said last-named lens, and means actuated by the movement of the short arm of said bell crank to shift the other of said lenses at a velocity different from the speed of movement of the lens by which said bell crank is pivotally moved.

3. In a lens system, a supporting member, a primary lens and a secondary lens, means to mount and maintain said lenses axially coincident for sliding movement upon said member, a bell crank pivotally mounted on said member, mechanism, including a cam, operatively interposed between said primary lens and said bell crank to move said crank on its pivot, and means actuated by the movement of said bell crank to move the secondary lens relative to the primary lens a distance and at a velocity determined by the contour of said cam, means to change the position of said cam relative to said bell crank to vary, in response to movement of said primary lens, the pivotal movement of the crank and the movement of the secondary lens.

4. In a lens system, a supporting base, a primary lens and a secondary lens, means to support and maintain said lenses axially coincident, a member having one end pivotally supported upon said base in a position parallel with the axis of said lenses, a cam plate pivoted to said member adjacent the end of the latter opposite to the pivoted end of said member, a locking device to render said member and plate relatively immovable, a cam carried by said cam plate, a cam follower connected to said primary lens and engageable with said cam to shift said member on its pivot, in accordance with the contour of the cam, upon movement of said primary lens, and means to shift said secondary lens in response to movement of said member, the movement pattern of said secondary lens being variable in accordance with the pivotal adjustment of said cam plate on said member.

5. In a lens system, a supporting member, a primary lens and a secondary lens, means to support and maintain said lenses axially coincident, an actuating member having one end pivoted to said supporting member in a position substantially parallel to the common axis of said lenses, a cam plate pivoted to said actuating member, a locking device to secure said actuating member and cam plate relatively immovable, a cam mounted upon said cam plate, a cam follower connected to said primary lens and engageable with said cam to shift said cam, cam plate and actuating member about the pivot of the latter, and means to shift said secondary lens in response to movement of the actuating member, the movement pattern of said secondary lens being variable in accordance with the pivotal adjustment of said cam plate relative to said member.

6. In a lens system, a supporting member, a primary lens and a secondary lens, means to support and maintain said lenses axially coincident, a bell crank pivoted to said supporting member, a cam plate pivoted to said bell crank, a locking device to normally secure said bell crank and cam plate relatively immovable, a cam mounted upon said cam plate, a cam follower connected to said primary lens and engageable with said cam to shift said cam, cam plate and bell crank about the pivot of the latter, and means to shift said secondary lens in response to movement of said bell crank, the movement pattern of said secondary lens being variable with the pivotal adjustment of said cam plate on said bell crank.

7. In a lens system, a supporting member, a primary lens and a secondary lens, means to support and maintain said lenses axially coincident, a bell crank pivoted to said supporting member, a cam plate pivoted to said bell crank, a locking device to normally secure said bell crank and cam plate relatively immovable, a cam mounted upon said cam plate, a cam follower connected to said primary lens and engageable with said cam to shift said cam, cam plate and bell crank about the pivot of the latter, and means to shift said secondary lens in response to movement of said bell crank, the movement pattern of said secondary lens being variable with the pivotal adjustment of said cam plate on said bell crank, said cam being flexible so as to assume various contours, and means to secure said cam in any of a plurality of different configurations.

JOSEPH B. WALKER.

REFERENCES CITED

The following references are of record in the file of this patent:

UNITED STATES PATENTS

| Number | Name | Date |
| --- | --- | --- |
| 953,879 | Williams | Apr. 5, 1910 |
| 1,755,105 | Douglass | Apr. 15, 1930 |
| 1,790,232 | Flora | Jan. 27, 1931 |
| 1,898,471 | Walker | Feb. 21, 1933 |
| 2,159,394 | Mellor et al. | May 23, 1939 |
| 2,165,341 | Capstaff et al. | July 11, 1939 |
| 2,235,364 | Gramatzki | Mar. 18, 1941 |